Aug. 4, 1953     E. H. KOESTER     2,647,722
TIRE SPREADER

Filed Oct. 6, 1950     2 Sheets-Sheet 1

Inventor
Ernest H. Koester
By Merchant & Merchant
Attorney

Aug. 4, 1953  E. H. KOESTER  2,647,722
TIRE SPREADER
Filed Oct. 6, 1950
2 Sheets-Sheet 2
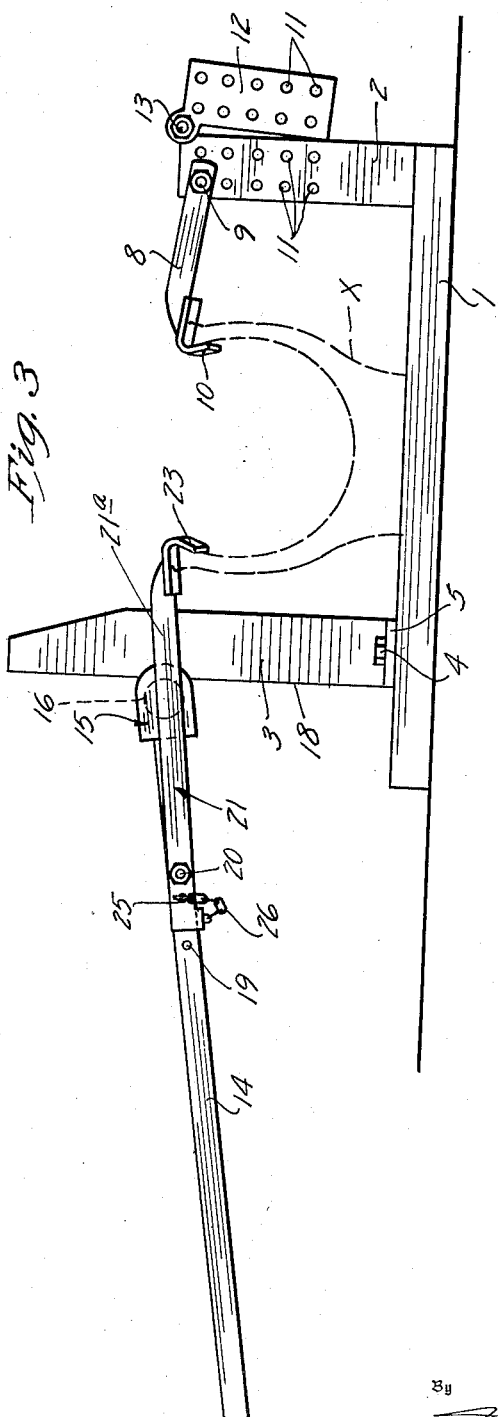
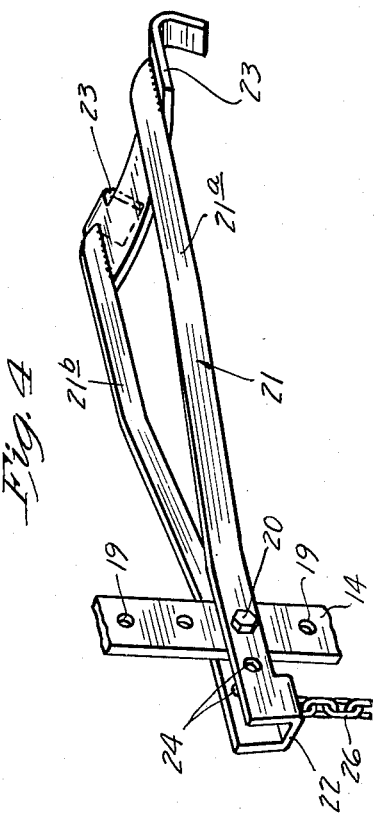
Inventor
*Ernest H. Koester*
By *Merchant & Merchant*
Attorney Patented Aug. 4, 1953

2,647,722

UNITED STATES PATENT OFFICE 2,647,722

TIRE SPREADER

Ernest H. Koester, Gaylord, Minn.

Application October 6, 1950, Serial No. 188,767

5 Claims. (Cl. 254—50.4)

My invention relates to devices for spreading apart the beads of pneumatic tire casings to facilitate inspection, the insertion and removal therein and therefrom of inner tubes, and the like.

The primary object of my invention is the provision of a relatively inexpensive and light-weight spreader capable of spreading the beads of even the largest and stiffest of tire casings with relative ease.

Another object of my invention is the provision of a device of the class described, which is capable, by adjustment of its parts, of being utilized in conjunction with tires varying considerably in diameter and cross-section.

Another object of my invention is the provision of a device which is extremely easy to operate, which is readily portable, and which is rugged in construction and durable in use.

The above and still further objects of my invention will become apparent from the following detailed specification, appended claims, and attached drawings.

Referring to the drawings, wherein like characters indicate like parts throughout the several views.

Figure 1:
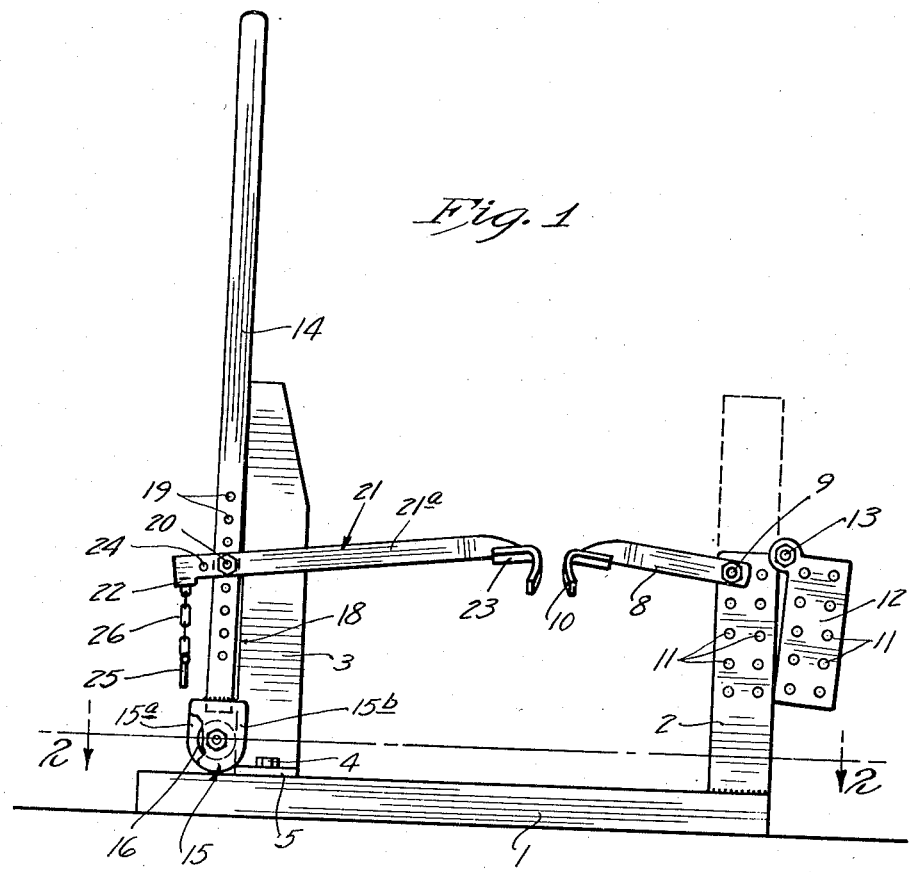
Fig. 1 is a view in side elevation of my novel structure.

Fig. 3 corresponds to Fig. 1 but illustrates a different position of some of the parts; and Fig. 4 is a fragmentary perspective view of one of the spreader bars of my novel device.

Referring with greater particularity to the drawings, wherein like characters indicate like parts throughout the several views, the numeral 1 indicates a base member, as shown preferably elongated and rectangular in shape. Rigidly and preferably non-adjustably secured to the base member 1 and projecting vertically therefrom is a leg 2. Preferably adjustably secured adjacent the opposite end of the base member 2 is a vertical leg 3. Preferably and as shown, the leg 3 is adjustable by virtue of the nut-equipped headed bolts 4 which extend through anchoring flange 5. The heads of the bolts 4, not shown, are adapted to be inserted through the enlarged ends 6 of longitudinally-spaced pairs of slots 7. Members 1, 2, and 3 cooperate to provide a U-shaped tire casing-receiving frame, as shown particularly by Fig. 3. The leg 3 may be moved closer or farther away from the leg 2 depending upon the cross-sectional diameter of the tire being received therebetween. A spreader bar 8 is pivoted, as at 9, to the leg 2 in spaced relation to the base 1 for swinging movements within the U-shaped frame. At its outer free end, the bar 8 is provided with a downwardly-opening hook 10. A plurality of vertically-spaced openings 11 permit vertical adjustment of the spreader bar 8 by placing the nut-equipped pivot pin 9 therein. The leg 2 may be vertically-extended by moving the supplemental member 12 on the pivot 13 from the full line to the dotted line position, as shown in Fig. 1. Member 12 is likewise provided with a plurality of vertically-spaced openings 11.

Figure 2:
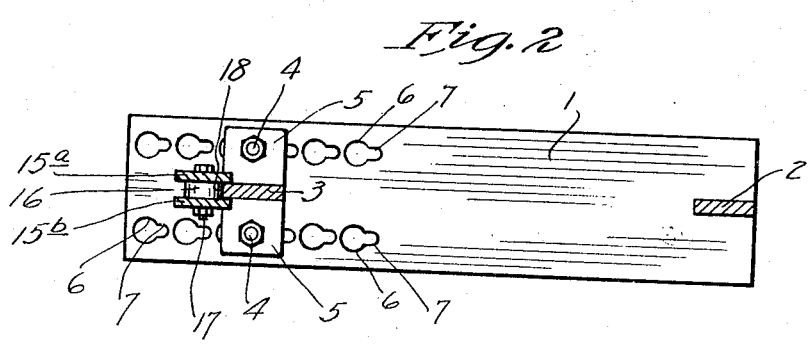
Fig. 2 is a view partly in section and partly in plan, taken on the line 2—2 of Fig. 1.

An elongated lever 14 is provided at its inner end with an enlarged bifurcated head 15, the spaced side members of which are adapted to straddle the leg 3, as shown in Fig. 2. The side members of the head 15 are identified by the numerals 15a and 15b, between which a roller 16 is journalled by means of a nut-equipped bolt 17. It will be noted that the roller 16 is adapted to ride upon the track-forming outer edge 18 of the leg 3 when it is moved from the position of Fig. 1 to the position of Fig. 3. Note that the members 15a and 15b prevent lateral movements of the lever 14 during the vertical sliding movements of the lever 14 with respect to the leg 3.

The intermediate portion of the lever 14 is provided with a plurality of longitudinally-spaced openings 19 into any one of which a nut-equipped pivot pin 20 may be adjustably secured. Pivotally mounted on the pivot pin 20 is a second spreader bar 21 which, preferably and as shown, is formed from a single piece of sheet metal stock and is provided with a pair of arms 21a and 21b which diverge toward their free ends and are joined together at their extreme outer ends by transverse portions 22 on their undersides. It will be noted that the pivot pin 20 is forwardly positioned with respect to the transverse portion 22. The inner free ends of the members 21a and 21b are each provided with downwardly-opening hook members 23, similar in all respects to the hook 10 carried by the spreader bar 8.

Intermediate the transverse connecting portion 22 of the spreader bar 21 and the pivot pin 20 are aligned transverse openings 24 which are alignable with the opening 19 immediately above the opening through which the pivot pin 20 extends. When the openings 19 and 24 are aligned by moving the lever 14 to the position of Fig. 3, a lock pin 25, preferably and as shown, carried by a chain or the like 26 depending from and secured to the transverse connecting portion 22, is inserted therethrough to lock, for a purpose which will hereinafter become apparent.

In operation, a tire casing A of a given size is rolled upon the base member 1, as indicated by the dotted lines in Fig. 3. The spreader arms are then vertically adjusted by positioning the pivot pins 9 and 20 respectively in the suitable openings 11 and 19. Thereafter, the spreader bars 8 and 21 are dropped onto the beads of the tire so that the hooks 10 and 23 project into the interior of the tire casing. Downward and outward movement is then imparted to the free end of the lever 14, as a result of which the same is caused to come into substantial longitudinal alignment with the spreader bar 21, as shown in Fig. 3. The roller 16, by riding upon track-like outer edge 18 of the leg 3, greatly reduces friction and facilitates this movement. It will be noted that, when substantial longitudinal alignment is attained between the lever 14 and the spreader bar 21, the lower edge of the lever 14 comes into contact with the transverse portion 22 and downward movement of the free end of the lever 14 is thus limited thereby. To lock members 14 and 21 against accidental movement, the pin 25 is inserted through the now aligned openings 24 and 19. It will be noted that the beads of the tire have now been spread apart adequately to permit inspection, insertion and removal of inner tubes, and the like—after which the beads may be allowed to assume their normal position by removing the pin 25 from the aligned openings 24 and 19 and moving the free end of the lever upward beyond dead center relationship.

My invention has been thoroughly tested and found to be completely satisfactory for the accomplishment of the above objects; and, while a preferred embodiment thereof is shown in the drawings, it should be obvious that the same is capable of considerable modification without departure from the spirit of the invention as defined in the appended claims.

What I claim is:

1. In a device of the class described, a base member, a pair of upstanding legs secured to said base member in laterally-spaced relation and defining therewith a U-shaped tire casing-receiving frame, a hook-equipped spreader bar pivotally secured to one of said legs in spaced relation to the base, the other of said legs being formed to provide a vertically-extended track, a lever associated with said other leg, said lever at its inner end being provided with a bifurcated head which straddles said track, a roller carried by said head and engageable with said track, a second hook-equipped spreader arm pivotally secured to the intermediate portion of said lever and movable toward and away from the first-mentioned spreader arm by pivotal movements of said lever about the axis of the pivotal connection therebetween and said spreader arm and by vertical movements of the roller-equipped end of said lever on said track.

2. The structure defined in claim 1 in further combination with means limiting downward movement of the free end of said lever with respect to its cooperating spreader bar when said lever and bar are substantially longitudinally aligned with each other, and means for locking the free end of said lever against accidental upward movements with respect to said spreader bar.

3. In a device of the class described, a base member, a pair of upstanding legs secured to said base member in laterally-spaced relation and defining therewith a U-shaped tire casing-receiving frame, a hook-equipped spreader bar pivotally secured to one of said legs in spaced relation to the base, a lever associated with the other of said legs, the inner end of said lever being adapted to slide vertically on said leg, a second hook-equipped spreader arm pivotally secured to the intermediate portion of said lever and movable toward and away from said first-mentioned spreader arm by pivotal movements of said lever about the axis of the pivotal connection therebetween and said second spreader arm and vertical sliding movements of said lever on said leg, and means limiting lateral movements of said lever with respect to said leg during vertical sliding movements.

4. In a device of the class described, a base member, a pair of upstanding legs secured to said base member in laterally-spaced relation and defining therewith a U-shaped tire casing-receiving frame, a hook-equipped spreader bar pivotally secured to one of said legs in spaced relation to the base, a lever associated with the other of said legs, the inner end of said lever being adapted to slide vertically on said leg, a second hook-equipped spreader arm pivotally secured to the intermediate portion of said lever and movable toward and away from said first-mentioned spreader arm by pivotal movements of said lever about the axis of the pivotal connection therebetween and said second spreader arm and vertical sliding movements of said lever on said leg, said lever being provided with a bifurcated head adapted to receive its cooperating leg whereby to limit lateral movements of said lever during vertical sliding movements, and a leg-engaging roller carried by said head.

5. In a device of the class described, a base member, a pair of upstanding legs secured to said base member in laterally-spaced relation and defining therewith a U-shaped tire casing-receiving frame, a hook-equipped spreader bar pivotally secured to one of said legs in spaced relation to the base, a lever associated with the other of said legs, the inner end of said lever being adapted to slide vertically on said leg, a second hook-equipped spreader arm pivotally secured to the intermediate portion of said lever and movable toward and away from said first-mentioned spreader arm by pivotal movements of said lever about the axis of the pivotal connection therebetween and said second spreader arm and vertical sliding movements of said lever on said leg, and means for locking said lever with respect to said second spreader bar against accidental movements when said members are in longitudinal alignment with each other.

ERNEST H. KOESTER.

References Cited in the file of this patent

UNITED STATES PATENTS

| Number | Name | Date |
|---|---|---|
| 479,561 | Forbes | July 26, 1892 |
| 2,496,389 | Goodman | Feb. 7, 1950 |
| 2,528,362 | Hauta | Oct. 31, 1950 |
| 2,571,624 | Schwartz | Oct. 16, 1951 |